SPEEDOMETER.
APPLICATION FILED NOV. 24, 1909.
961,676.
Patented June 14, 1910.
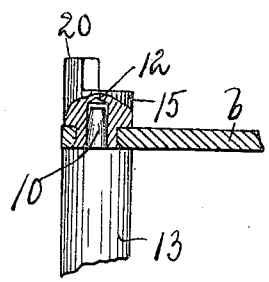
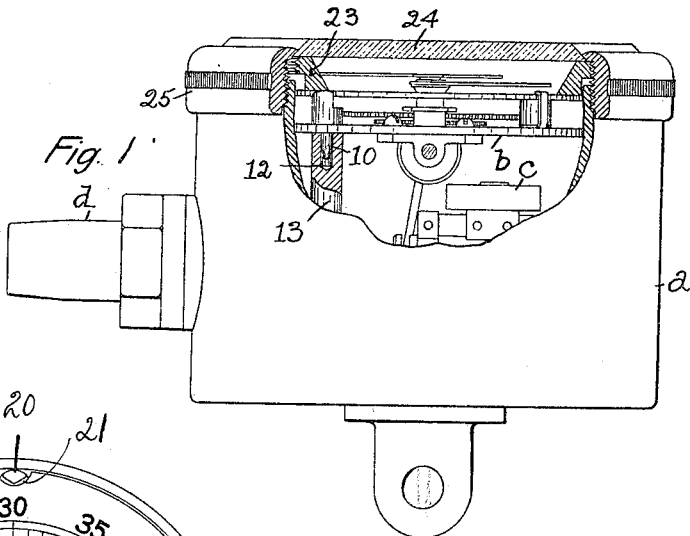
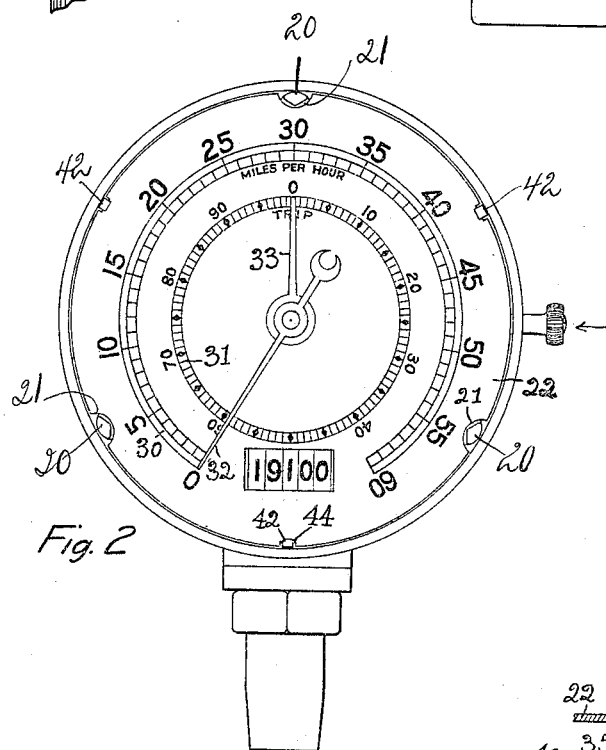
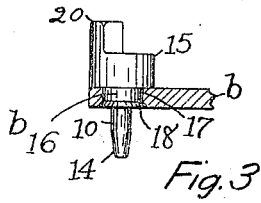
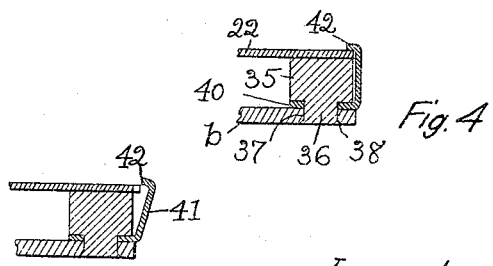
Witnesses
C. I. Babcock
J. Murphy
Inventor
Leon E. Blanchard
per
Jas. H. Churchill
Attorney.

UNITED STATES PATENT OFFICE.

LEON E. BLANCHARD, OF BOSTON, MASSACHUSETTS, ASSIGNOR TO RELIANCE SPEED-METER COMPANY, OF BOSTON, MASSACHUSETTS, A CORPORATION OF MAINE.

SPEEDOMETER.

961,676. Specification of Letters Patent. Patented June 14, 1910.

Application filed November 24, 1909. Serial No. 529,729.

*To all whom it may concern:*

Be it known that I, LEON E. BLANCHARD, a citizen of the United States, residing in Boston, county of Suffolk, and State of Massachusetts, have invented an Improvement in Speedometers, of which the following description, in connection with the accompanying drawings, is a specification, like characters on the drawings representing like parts.

This invention relates to speedometers especially designed and adapted for use on automobiles and like vehicles.

The present invention has for its object to provide an instrument of this class in which perfect alinement of the governor shaft within the inclosing shell of the instrument with the driving shaft outside of said case is insured when the instrument is assembled, which alinement is maintained when the instrument is in use on the vehicle and is unaffected by the vibrations of the latter.

The invention further has for its object to provide a simple, inexpensive and efficient means for securing the usual dial to the framework of the instrument.

These and other features of this invention will be pointed out in the claims at the end of this specification.

Figure 1 represents in side elevation with parts broken out, an instrument embodying this invention. Fig. 2, a plan view of the instrument shown in Fig. 1 with the cover removed, Figs. 3, 4 and 5, details to be referred to and Fig. 6, a modification to be referred to.

Referring to the drawings, $a$ represents a cylindrical shell or case, closed at its bottom and provided at its top with a removable cover, and $b$ represents the supporting frame or plate for the movable parts of a speedometer movement having a centrifugally operated governor $c$, whose shaft (not shown) is coupled to a flexible external driving shaft (not shown), but supported by a tubular bearing $d$ extended laterally from said shell or casing.

The present invention has for its object to provide simple, efficient and reliable means for centering the movement supporting frame or plate $b$, so that the governor shaft is brought into perfect alinement with the external driving shaft. For this purpose, I employ centering pins 10 and sockets 12 into which said pins are extended. In the present instance, the centering pins 10 are shown as secured to the plate $b$, and the sockets 12 are shown as formed in posts 13 secured to the casing $a$ within the same, but the reverse arrangement may be employed as represented in Fig. 6. The centering pins 10 are provided with tapering ends 14 to facilitate entrance into their sockets.

The socketed supports or posts 13 are attached to the casing $a$ in fixed relation thereto so as to insure perfect alinement of the governor shaft with the driving shaft and with the center of the bearing $d$ for said driving shaft, when the movement is inserted into the casing and the pins 10 are inserted into their sockets 12.

The centering pins 10 may and preferably will be provided with heads 15 (see Fig. 3) located above the frame or plate $b$ and provided with a reduced portion or neck 16, which extends through a hole 17 in the said plate and is upset at its lower edge to form a locking flange 18, preferably beveled to fit a countersunk enlargement of the hole 17 and practically rivet the centering pin to the said disk.

The heads 15 may be provided with upright arms 20, which extend through openings 21 in the dial 22 and are engaged as shown in the present instance by the reflector ring 23, which screws into the bezel ring 25 and secures the glass top 24 to the said bezel ring, which coöperates with the glass top to form the cover for the casing $a$.

When the cover of the casing is screwed upon the same to close it, the ring 23 engages the arms 20 and forces the latter downward until the plate $b$ is firmly seated on its supports, which in the present instance, are the posts 13, thereby firmly holding the plate $b$ and the parts supported by it from upward movement, and thus avoiding the governor shaft being moved out of alinement with its driving shaft by the vibration of the vehicle.

I may prefer to use the reflector ring for engaging the arms 20, but I do not desire to limit the invention in this respect.

The dial 22 is provided with the usual graduations indicative of distance, and in the present instance, is shown as provided with two sets 30, 31, with which coöperate two pointers 32, 33, the pointer 32 indicating speed, and the pointer 33 indicating the distance traveled on a trip. Provision is made for supporting the dial and for holding it in fixed relation to its supports. For this purpose, the frame or plate *b* has erected upon it a plurality of posts 35, only one of which is shown, upon which the dial 22 rests. Each post 35 is provided with a reduced portion 36 projecting from its underside through an opening 37 in the plate *b* and upset or riveted at its end to form a locking flange 38 (see Fig. 4), which firmly secures the post to the said plate. The opening 37 is preferably countersunk to receive the flange 38 so that the said flange may be flush with the under surface of the plate *b*. The post 35 has coöperating with it a device for holding the dial down on the post and also against rotary movement.

The holding device referred to, may and preferably will be made as herein shown, and consists of a ring or washer 40, which is interposed between the bottom of the post 35 and the plate *b* and through which the reduced portion 36 of the post is extended, said ring having an upwardly extended yielding arm 41 provided with a laterally extended finger 42, which overlaps the edge of the dial, when the movement is in its operative position within the case.

The arm 41 is of flexible metal and normally extends upward at an angle as shown in Fig. 5, and is bent inward by the operator to overlap the dial.

When the movement is inserted in the casing *a*, the latter acts to keep the arm inward and into a notch 44 in the edge of the dial, said arm at such time being in a substantially vertical position as represented in Fig. 4 with the finger 42 overlapping the rear wall of the notch 44 in the dial.

The finger 42 serves to hold the dial 22 firmly down on the post 35 against upward movement by vibration, and the arm 41 coöperates with the side walls of the notch 44 to prevent displacement of the dial by rotary movement.

In practice I may prefer to employ three centering pins 10 and sockets 12 located about 120° apart, as represented in Fig. 2 by the arms 20, and also three posts 35 arranged intermediate the said pins and sockets and about 120° apart, as represented by the fingers 42 in Fig. 2.

From the above description, it will be seen that the holding devices for the dial are automatically retained in their operative positions by the inclosing case.

The construction herein shown is simple, inexpensive, easy to assemble, and is highly efficient in operation.

Claims.

1. In an instrument of the class described, in combination, an inclosing case open at its top and provided with a removable cover therefor, a speedometer movement provided with a supporting frame located in said case, a support within the case for said frame, and a pin and socket connection between said frame and said support for centering said frame within said case, substantially as described.

2. In an instrument of the class described, in combination, an inclosing case open at its top and provided with a removable cover therefor, a speedometer movement provided with a supporting frame located in said case, a support within the case for said frame, a pin and socket connection between said frame and said support for centering said frame within said case, devices erected upon said frame, and means carried by said cover and coöperating with said devices for holding the said frame against upward movement, substantially as described.

3. In an instrument of the class described, in combination, an inclosing case open at its top and provided with a removable cover therefor, a speedometer movement provided with a supporting frame located in said case, a support within the case for said frame, a pin and socket connection between said frame and said support for centering said frame within said case, posts erected upon said frame, a dial supported by said posts, and holding devices for said dial carried by said posts and automatically retained in their operative position by said case, substantially as described.

4. In an instrument of the class described, in combination, an inclosing case open at its top and provided with a removable cover therefor, a speedometer movement provided with a supporting frame located in said case, means to support said frame within the case, a dial, posts erected upon said frame, and holding devices for said dial carried by said posts and automatically retained in their operative position by said case, substantially as described.

5. In an instrument of the class described, in combination, a case provided with a removable top, a speedometer movement provided with a supporting plate, centering pins depending from said plate, supports for said plate within the case having sockets into which said pins enter, uprights erected upon said plate and coöperating with the said cover to hold the said plate down on its supports, substantially as described.

6. In an instrument of the class described, in combination, a case, a speedometer movement provided with a supporting plate, uprights erected upon said plate and provided with reduced lower portions extended into holes in said plate, a dial resting on said uprights, and holding devices for said dial comprising rings encircling said reduced portion of the uprights between the latter and the said plate, arms extended upwardly from said rings, and fingers extended laterally from said arms and overlapping said dial, substantially as described.

7. In an instrument of the class described, in combination, an inclosing case open at its top and provided with a removable cover therefor, a speedometer movement provided with a supporting frame located in said case, a support within the case for said frame, a pin and socket connection between said frame and said support for centering said frame within said case, and means coöperating with said frame and cover to hold the frame against upward movement, substantially as described.

In testimony whereof, I have signed my name to this specification in the presence of two subscribing witnesses.

LEON E. BLANCHARD.

Witnesses:
   JAS. H. CHURCHILL,
   J. MURPHY.